P. J. CLARK.

Lamp.

No. 7,393.

Patented May 28, 1850.

UNITED STATES PATENT OFFICE.

P. J. CLARK, OF MERIDEN, CONNECTICUT.

MAKING RESERVOIRS OF METALLIC LAMPS.

Specification of Letters Patent No. 7,393, dated May 28, 1850.

*To all whom it may concern:*

Be it known that I, P. J. CLARK, of Meriden, in the county of New Haven and State of Connecticut, have invented a new and useful Improvement in the Construction of Lamps; and I do hereby declare that the following is a full, clear, and exact description of the same, reference being had to the accompanying drawings, forming part of this specification, in which—

Figure 1:
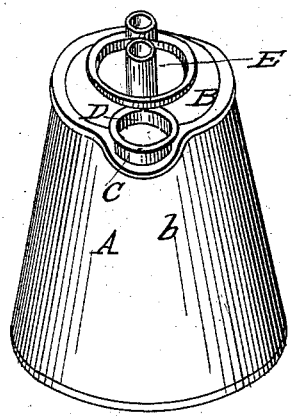
Figure 2:
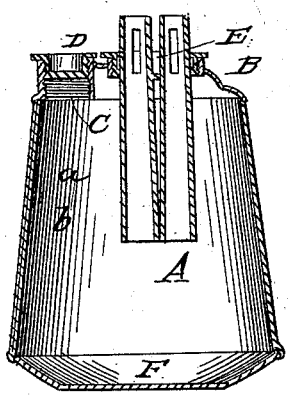
Figure 3:
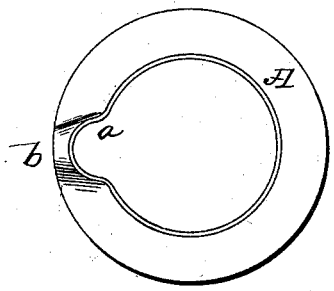
Figure 4:
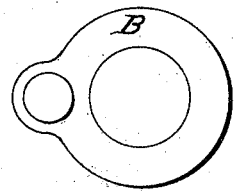
Figure 5:
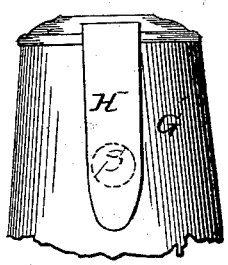
Figure 6:
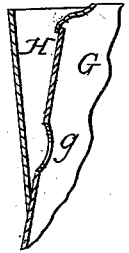

Figure 1 is a perspective view of one of my improved lamps. Fig. 2 is a section through the center taken in a line through the center of the feeder. Fig. 3 is a top view of the body of the reservoir before the top and bottom are put on. Fig. 4 is the top plate. Figs. 5 and 6 represent the old mode of attaching the feeder.

Similar letters of reference indicate corresponding parts in each of the several figures.

The nature of my improvement consists in forming the feeders of lamps having their reservoirs made of tin or other sheet metal of the same piece of metal which forms the sides of the reservoir whereby I am enabled to construct the lamps cheaper and render them more durable as only one solder joint is necessary, that is the joint or seam up the side of the reservoir.

The ordinary mode of constructing lamps having sheet metal reservoirs is to make the sides or shell of the reservoir of one piece of metal making a joint or seam all the way up the side and leaving an aperture in the side; the feeder is formed of a separate piece of metal and soldered on over the said aperture.

To enable others skilled in the art to make and use my invention I will proceed to describe its construction.

A represents the piece of metal forming the sides of the reservoir, it is formed of a piece of sheet metal cut to the required shape and fitted by hammering to a block or mold the required form having a projection on one side which forms a recess $a$, in the inside of the lamp; the edges of the plate are made to overlap each other so as to form the joint $b$, of the center of the recess and are then soldered together.

B, is the top plate which is punched or cut out to fit over the top of the shell A, and has a hole to receive the burner and another hole which fits over the recess $a$ to receive the screw socket and cap of the feeder; it is soldered on in the usual manner.

C, is the screwed socket to receive the cap or cover of the feeder soldered into the top plate B.

D, is the screw cap or cover fitting the socket C.

E, is the burner fitted in the usual manner.

F, is the plate forming the bottom of the lamp.

G, (Figs. 5 and 6) represents part of the side of a reservoir constructed in the ordinary way.

H, is the feeder formed of a separate piece of metal soldered on.

$g$, is the hole forming the communication between the feeder and the reservoir. Considerable inconvenience is found to exist in lamps of this description constructed in the ordinary way as shown in Figs. 5 and 6— from the bubbling and splashing of the oil or fluid caused by the escape of air from the reservoir through the hole $g$, while the lamp is being filled, but this will be obviated in my improved lamp.

I can construct my lamp much quicker as there is less soldering, consequently I can make them cheaper; they are also stronger and less liable to be broken by falling or other accident. The improvement is also applicable to lamps of other shapes than the one represented in the drawings.

What I claim as new in my invention and desire to secure by Letters Patent is—

Making the shell A, of the lamp reservoir with the feeder $a$ standing out from one side of one single plate of metal so as to require only one seam or solder joint in the manner substantially as herein described.

P. J. CLARK.

Witnesses:
　S. S. CLARK,
　C. PARMELE.